United States Patent

[11] 3,612,851

[72] Inventor Howard R. Fowler
 Prospect, Conn.
[21] Appl. No. 29,457
[22] Filed Apr. 17, 1970
[45] Patented Oct. 12, 1971
[73] Assignee Lewis Engineering Company
 Naugatuck, Conn.

[54] ROTATABLY ADJUSTABLE INDICATOR INSTRUMENT
 9 Claims, 11 Drawing Figs.
[52] U.S. Cl. .................................................. 240/2.1,
 73/431, 116/129, 248/27, 324/156
[51] Int. Cl. ..................................................... G01d 11/28
[50] Field of Search ........................................... 116/124,
 129, 129 A, 129 B; 73/431; 248/27; 324/156

[56] References Cited
 UNITED STATES PATENTS

| | | | |
|---|---|---|---|
| 1,112,280 | 9/1914 | Fitch | 248/27 X |
| 1,441,279 | 1/1923 | Hammarlund | 248/27 X |
| 1,754,954 | 4/1930 | Johnson | 248/27 X |
| 2,684,862 | 7/1954 | Lamb | 73/431 X |
| 2,883,489 | 4/1959 | Eadie, Jr. et al. | 324/156 X |
| 3,263,503 | 8/1966 | White | 73/431 |

Primary Examiner—Louis J. Capozi
Attorney—H. Gibner Lehmann

ABSTRACT: An indicating instrument having a tubular casing with a viewing window at one end. Within the casing there is an instrument movement including a dial which is carried at the front of the movement, facing outward at the casing window. A thick mounting or base ring at the rear of the instrument movement carries the latter and has a rotary bearing in an adapter ring which latter is rigidly secured to the casing between the front and rear ends thereof. The adapter ring has slots through which there extend screws threaded into the base ring. By such arrangement the base ring and instrument movement carried thereby may be secured in any of a number of different rotative positions with respect to the adapter ring and casing. The casing comprises front and rear tubular parts which abut each other, and the adapter ring is disposed within and secured to the abutting portions of the casing parts, thereby to fasten these together. Removal of the rear casing part reveals the fastening screws which are threaded into the base ring, whereby these may be readily loosened and retightened in order to change the rotative position or attitude of the instrument movement and dial in the front casing part while these remain supported therein.

INVENTOR.
Howard R. Fowler

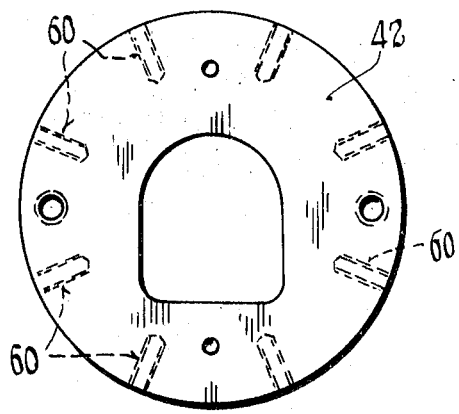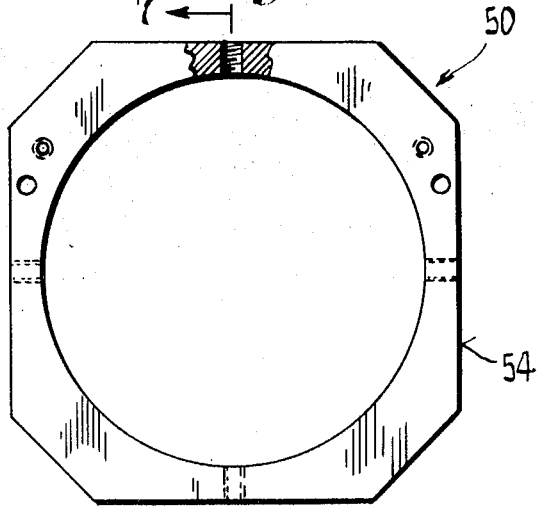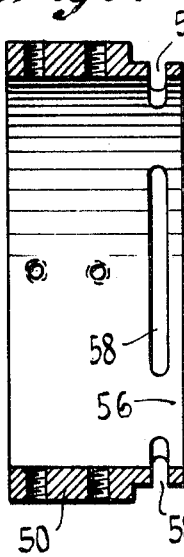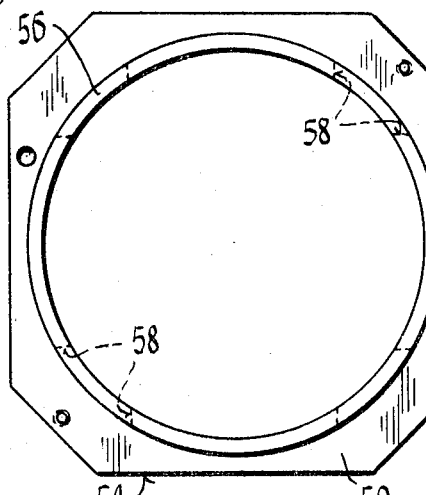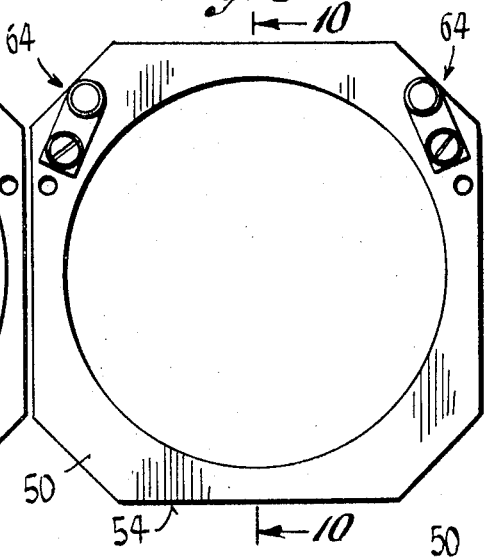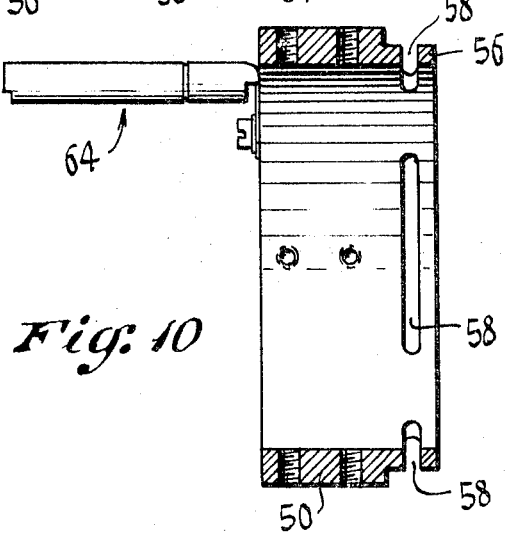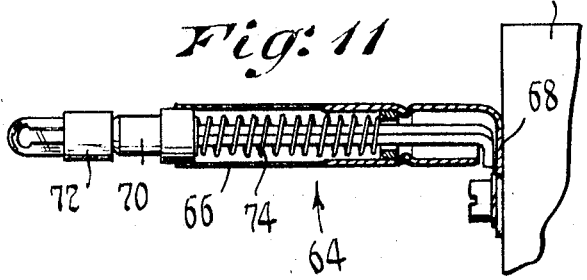
INVENTOR.
Howard R. Fowler
AGENT

ROTATABLY ADJUSTABLE INDICATOR INSTRUMENT

CROSS-REFERENCES TO RELATED APPLICATIONS

Copending application of Donald E. Protzmann, Ser. No. 881,197 filed Dec. 1, 1969 and entitled "Mounting for Panel-Type Instruments," and having common ownership with the present application.

BACKGROUND

This invention relates to indicating instruments, and more particularly to instruments which have provision for rotary adjustment of the instrument movement in order to change the rotative attitude of the movement and its indicating dial.

Instruments of the above type have been provided in the past with tubular casings which were essentially cylindrical, these casings being secured to a supporting panel by mounting screws which pass through a front bezel surrounding the front-viewing window. The mounting hole in the supporting panel was usually circular, whereby it was a simple matter to orient or rotatably adjust the instrument and casing prior to drilling the panel for the mounting screws. With such instruments there was usually no possibility for changing the instrument attitude after it had been initially set, unless new mounting holes were provided in the panel. If this were done of course, then the instrument casing could be readily turned to a new position.

Later instrument casings were made with a nonround configuration in order to accommodate lighting assemblages for illuminating the dial and pointer, and for other purposes. An octagonal shape of casing cross section was adopted, and also octagonal bezel configurations for the purpose of conserving the available space, as well as for other reasons. With such arrangement there no longer existed the possibility of easily changing the rotative attitude or position of the instrument, as this might be desired for various environmental reasons, unless the change involved for example a 90° shift in the rotative position. Often this was not possible or desirable. Therefore, if an attitude of the instrument was required which was different from that fixed by the manufacturer, it necessitated changing internal components such as the base mounting, the rear shield, the nameplate, etc.

SUMMARY

The foregoing drawbacks of prior indicating instruments are obviated by the present invention, which has for one object the provision of an improved panel-mounted casing-enclosed instrument wherein a large number of different rotative positions or attitudes may be readily had, all without changing any component parts or disturbing or altering the basic mounting arrangement between the casing, the panel and the movement proper. This is accomplished by the provision of an instrument movement assemblage which at its rear is carried on a relatively thick and heavy mounting or base ring, said ring being turnably adjustably secured to a cooperable adapted ring which latter in turn is rigidly secured to the instrument casing between the front and rear ends thereof. The base ring is fastened to the adapter ring by screws which may be conveniently loosened and retightened, the arrangement including slots and a multiplicity of threaded holes accommodating the screws by which an infinite number of different rotative positions of the instrument movement can be had within the casing.

Other objects of the invention involve the provision of an improved rotatably adjustable indicating instrument as above set forth, wherein access may be had to the adjustment device for the instrument movement, without requiring dismantling of the latter from the casing; the provision of an improved adjustable instrument as above, wherein relatively few parts are required; and an adjustable instrument as above set forth which is sturdy and reliable in its construction and operation, and characterized by ease of assembly and low fabricating cost.

Other features and advantages will hereinafter appear.

In the accompanying drawings:

FIG. 5 is a front plan view of the base ring of the instrument.

FIG. 6 is a front plan view of the adapter ring of the instrument.

FIG. 7 is a diametric section, taken on the line 7—7 of FIG. 6.

FIG. 8 is a rear elevational view of the adapter ring of FIGS. 6 and 7.

FIG. 9 is a front elevational view of the adapter ring with attached incandescent lighting units.

FIG. 10 is a diametric section, taken on the line 10—10 of FIG. 9.

FIG. 11 is a detail partly in axial section and partly in side elevation, of one incandescent lighting unit.

Figure 1:
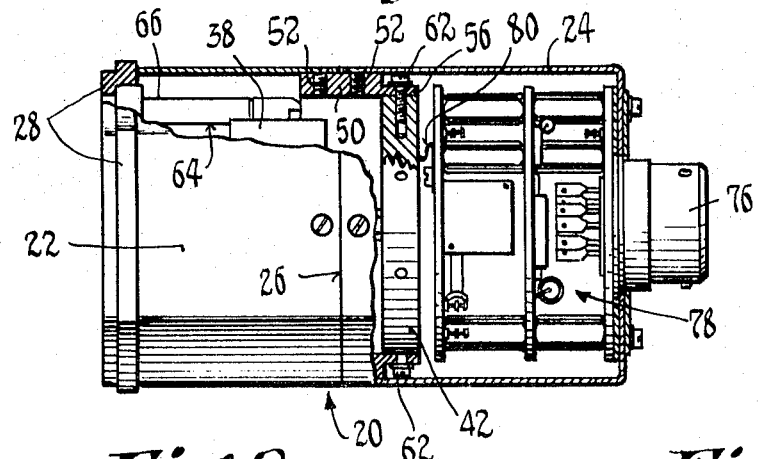
FIG. 1 is a view partly in side elevation and partly in axial section, of an indicating instrument embodying the adjustable rotary arrangement of the invention.
Figure 2:
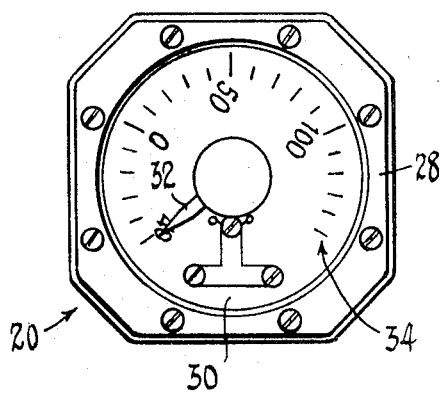
FIG. 2 is a front end view of the instrument of FIG. 1.
Figure 3:
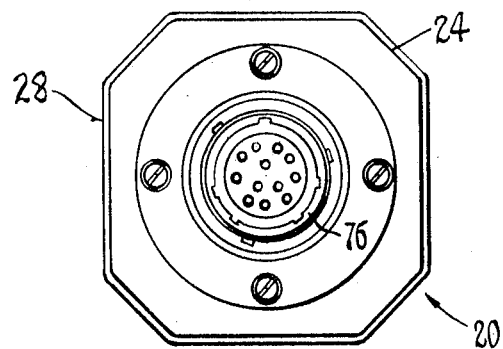
FIG. 3 is a rear end view of the instrument.

Referring first to FIGS. 1-3, the improved turnably adjustable indicating instrument comprises a tubular casing 20 of octagonal cross section, said casing having a front tubular part 22 and a rear tubular part 24 whose adjoining edges abut each other at a joint 26. The front-casing part 22 has an annular mounting bezel 28 surrounding a viewing window 30 through which there can be observed the pointer 32 and dial 34 of an instrument movement illustrated in side elevation in FIG. 4. The dial 34 is carried on a mounting plate 36 which is supported in front of a movement proper 38 details of which per se form no part of the present invention and accordingly are not shown or described in detail. It will be understood that electrical energization of the instrument movement will result in shifting of the pointer 32 over the dial 34, to provide readings. The movement 38 and mounting plate 36 for the dial are assembled with suitable spacers or bushings 40.

Figure 4:
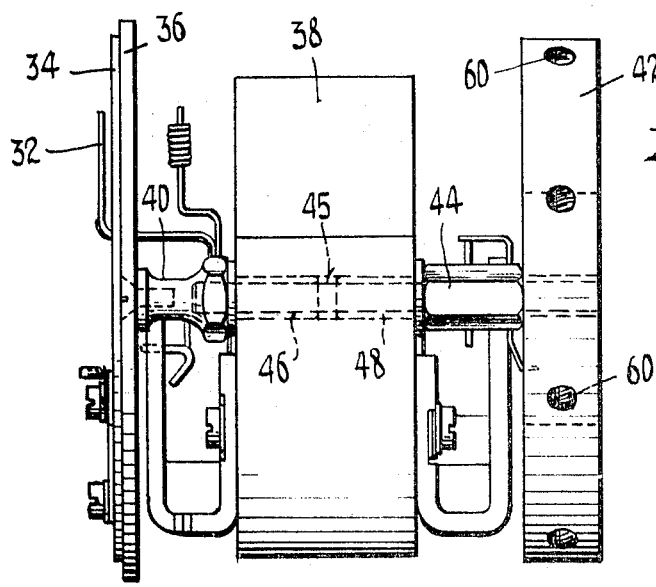
FIG. 4 is a side elevational view of the assemblage of instrument movement and mounting or base ring thereof.

In accordance with the present invention means are provided to enable the instrument movement with its pointer, dial and dial-mounting plate to be readily rotatively adjusted without requiring any alteration of parts such as the base mounting, shield, nameplate etc. In effecting this the movement 38 is assembled to and mounted on an adjustment part comprising a base ring 42 of relatively thick, rigid construction, as by means of spacer bushings 44, studs 45 and insulating sleeves 46, 48. With such arrangement as seen in FIG. 4, the movement 38 and the indicator assemblage are rigidly carried at the front of the base ring 42.

Within the casing 20 and between the front and rear ends thereof there is provided an adapter ring 50 which is secured to the casing parts 22, 24 by screws 52. The adapter ring is disposed within the abutting portions of the casing parts at the joint 26 thereof; by means of the screws 52 it secures the casing parts rigidly together in assembled relation. The adapter ring 50 has an octagonal outer periphery 54 adapted to closely fit within the inside of the casing 20, and has at its rear side a circular flange 56 which slidably receives the base ring 42 of the instrument assemblage. Preferably, as shown, the flange 56 and body portion of the adapter ring have cylindrical bores which are continuations of each other.

By the present invention, the flange 56 is provided with a plurality, here shown as 4, of slots 58, and the base ring 42 is provided with a plurality of tapped holes 60 to accommodate adjustment screws 62 which pass inwardly through the slots 58 and are threaded into the base ring 42. By such arrangement, the base ring is turnably mounted in the adapter ring 50 and may be shifted to a large number of different rotative positions and then secured, as by first loosening and then tightening the fastening screws 62. Also, in accordance with the invention, the base ring 42 has an excess number of threaded holes 60, there being preferably eight such holes in conjunction with the four slots 58 of the adapter ring 50. Accordingly, with such arrangement it is possible to place the base ring 42 and instrument movement in any of an infinite number of rotative positions. It will be noted that the provision of the flange 56 at the inner periphery of the adapter ring 50 provides clearance for the heads of the screws 62, within the rear of the casing 20. Also, by removal of the rear casing part 24 the fastening screws 62 will be revealed, and may be loosened and tightened again to rotatably shift the instrument movement while it remains within the front-casing part 22. Thus, there is no necessity for changing any components, or for dismantling the instrument movement beyond the temporary removal of the rear-casing part 24, in order to change the rotative attitude of the movement and dial, and this can be effected all without disturbing the mounting of the front-casing part 22 on the supporting panel (not shown).

Referring to FIGS. 1 and 9-11, the adapter ring 50 mounts lighting assemblages 64, said assemblages comprising tubular holders 66 secured by bracket portions 68 to the front side of the adapter ring. The lighting assemblages 64 include receptacles 70 in which lamps 72 are mounted, said receptacles being biased forwardly by compression coil springs 74 in the tubular holders 66. By such arrangement, the assemblage of instrument movement 38 and base ring 42 can be adjustably positioned in the casing 20 without disturbing the instrument lighting comprising the units 64, since these remain stationary with the stationary adapter ring 50.

The rear-casing part 24 has at its backwall an electrical receptacle 76, and carries within it electrical circuitry 78 associated with the indicating instrument in the front-casing part 22. By the provision of flexible leads 80 between the circuitry 78 and the instrument movement, the rear-casing part 24 can be readily removed without disturbing or disconnecting the wiring, for the purpose of changing the orientation of the instrument movement within the casing.

It will now be understood from the foregoing that I have provided a novel and improved indicating instrument wherein rotary adjustment is provided in a simple and reliable manner, to enable change in the attitude of the instrument with its associated pointer and dial to be effected. Relatively few parts are involved, and the indicator is capable of being placed in an infinite number of different rotative positions without requiring alteration of manufactured parts, and with the least possible dismantling, involving merely a removal of the rear-casing part to reveal the fastening screws for the adjustable mounting. The various parts may be economically fabricated and assembled, and the entire instrument is simplified as to its servicing, adjustment, and adaptability to different environments.

Variations and modifications are possible without departing from the spirit of the invention.

I claim:

1. A turnably adjustable indicator instrument comprising, in combination:
   a. a tubular casing having a viewing window at one end,
   b. an indicating instrument movement in the casing, and a dial carried on the front of the movement, said dial being disposed face outward at the window end of the casing,
   c. an adapter ring having a bearing surface, said adapter ring being rigidly secured in the casing between the two ends thereof,
   d. a base ring rigidly secured to the rear of the instrument movement, said base ring being engaged with the bearing surface of the adapter ring and being turnable with respect thereof, and
   e. releasable fastener means for securing the base ring to the adapter ring in any of a number of different rotative positions, thereby to enable the instrument movement and dial to be secured in the casing in any of a number of different rotative attitudes.

2. An instrument as in claim 1, wherein:
   a. the casing comprises a front tubular part, and a rear tubular part abutting the front part,
   b. said adapter ring being disposed within and being secured to the abutting portions of the casing parts, thereby to fasten the parts together.

3. An instrument as in claim 2, wherein:
   a. the releasable fastening means comprises screws disposed radially at one side of the adapter ring and arranged with their exposed ends outermost,
   b. removal of one casing part from the adapter ring revealing the exposed ends of the screws, thereby to enable loosening and tightening of the screws to be effected for adjustably positioning the instrument movement.

4. An instrument as in claim 3, wherein:
   a. the adapter ring has a cylindrical bore,
   b. said base ring having a cylindrical exterior turnably fitting in the bore of the adapter ring,
   c. said adapter ring having slots through which said fastening screws extend.

5. An instrument as in claim 4, wherein:
   a. the instrument movement is mounted on the front face of the base ring,
   b. said base ring being secured to the adapter ring at the rear side thereof.

6. An instrument as in claim 1, and further including:
   a. an incandescent lamp for lighting said dial, and
   b. means mounting the incandescent lamp on the adapter ring to project from the front side thereof in close proximity to the dial.

7. An instrument as in claim 1, wherein:
   a. the adapter ring has a slotted circular flange at one side thereof,
   b. said base ring slidably fitting within said circular flange,
   c. said fastening means comprising screws extending through the slots of the circular flange and threaded into the base ring, to effect the adjustable positioning of the base ring in the adapter ring.

8. An instrument as in claim 7, wherein:
   a. the base ring has threaded holes in excess of the number of slots in the adapter ring flange, thereby to extend the range of rotary adjustment of the base ring in the adapter ring.

9. An instrument as in claim 8, wherein:
   a. the flange of the adapter ring is spaced inwardly from the outer periphery of the ring, thereby to provide clearance for the heads of the fastening screws.